March 8, 1938.　　　F. A. PARKHOUSE　　　2,110,510
HOG GREASER
Original Filed Aug. 20, 1935　　2 Sheets-Sheet 1
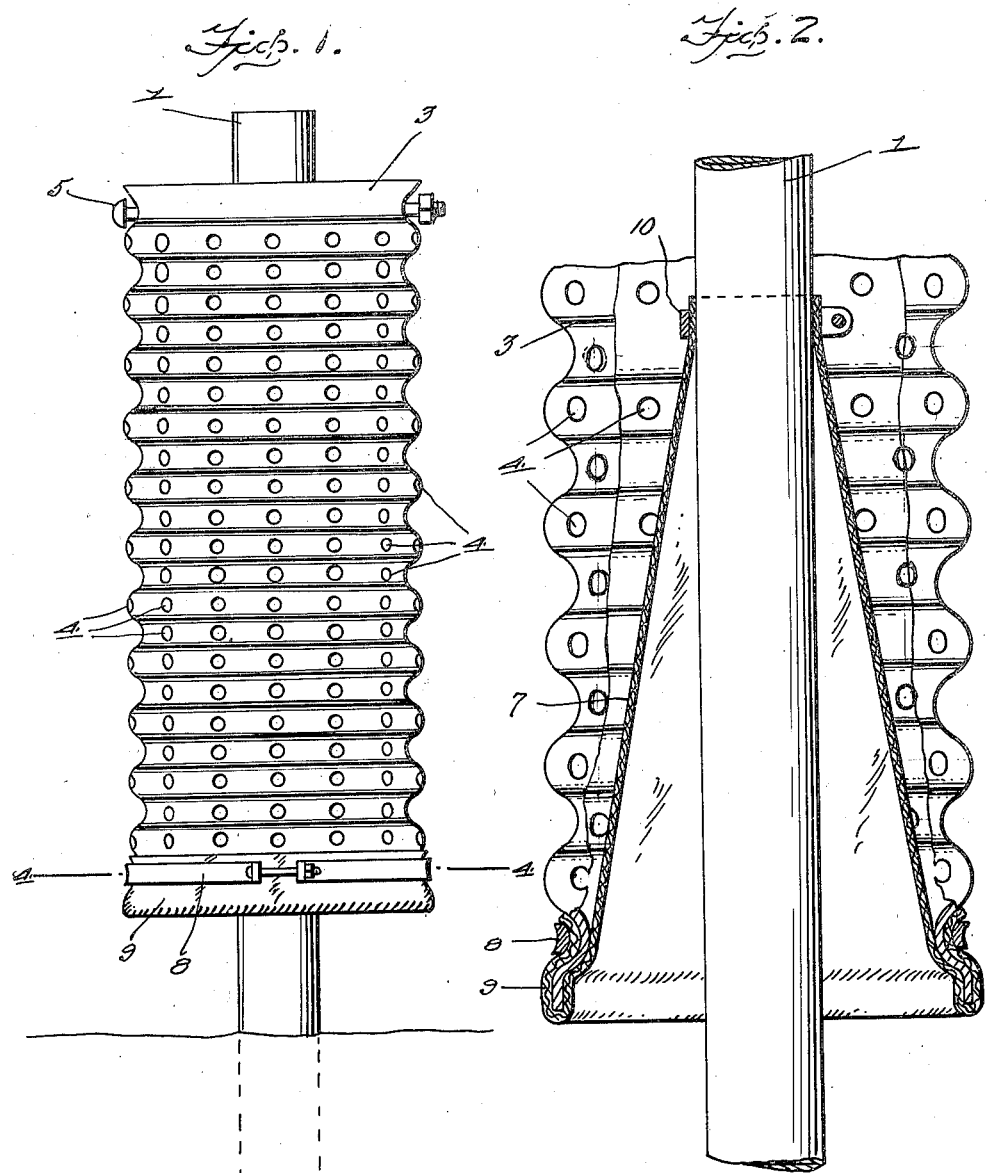
Inventor
Frances A. Parkhouse
By Clarence A. O'Brien
Attorney March 8, 1938.  F. A. PARKHOUSE  2,110,510
HOG GREASER
Original Filed Aug. 20, 1935   2 Sheets-Sheet 2
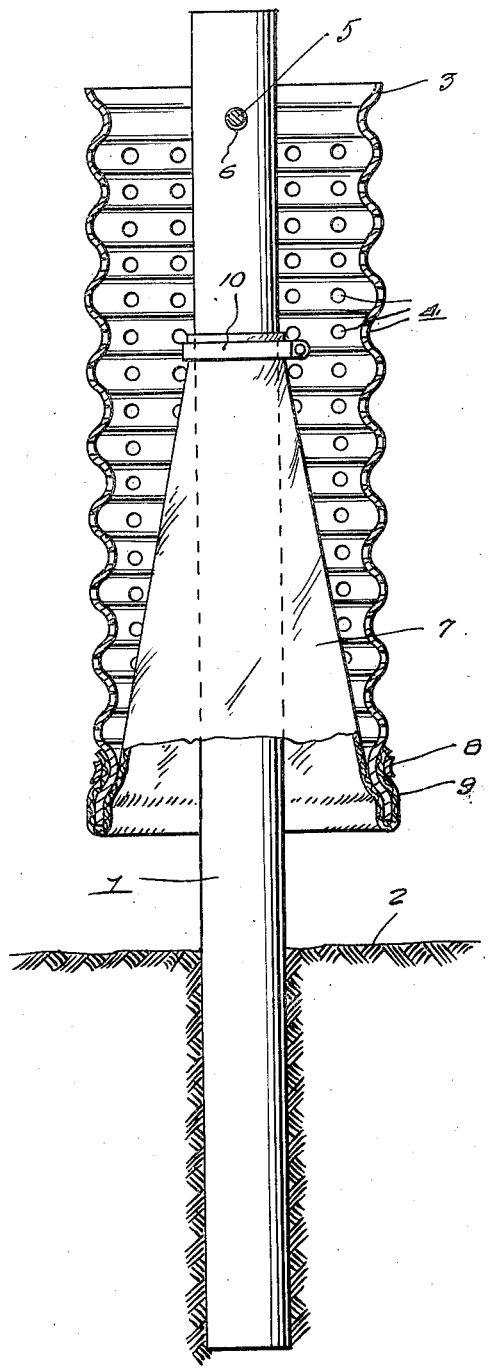
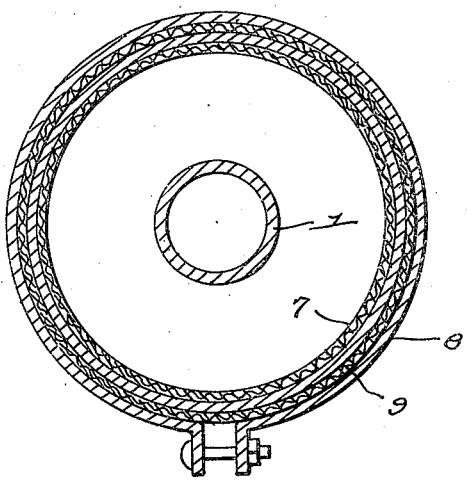
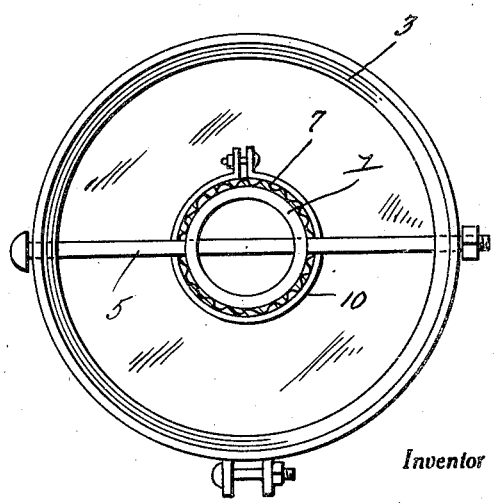
Inventor
Frances A. Parkhouse
By Clarence A. O'Brien
Attorney Patented Mar. 8, 1938

2,110,510

UNITED STATES PATENT OFFICE 2,110,510

HOG GREASER

Frances A. Parkhouse, Maquoketa, Iowa

Application August 20, 1935, Serial No. 37,055
Renewed September 18, 1937

1 Claim. (Cl. 119—157)

The present invention relates to new and useful improvements in hog greasers and has for its primary object to provide, in a manner as hereinafter set forth, a device of this character embodying a novel construction, combination and arrangement of parts through the medium of which a vermin exterminating substance will be automatically applied to the animal when said animal rubs against the device.

Another very important object of the invention is to provide a hog greaser of the type including a post supported container for the reception of a vermin exterminating medium, together with novel means for mounting said container on the post for universal swinging movement.

Other objects of the invention are to provide a hog greaser of the character described which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of a hog greaser constructed in accordance with the present invention.

Figure 2 is a view in side elevation of the lower portion of the device with parts broken away.

Figure 3 is a view in side elevation of the invention on a plane at right angles to Figure 1 and with parts broken away.

Figure 4 is a view in horizontal section, taken substantially on the line 4—4 of Figure 1.

Figure 5 is a top plan view of the invention.

Referring now to the drawings in detail, it will be seen that the embodiment of the invention which has been illustrated comprises a post 1 which is to be firmly anchored in the ground 2. The post 1 is adapted to support in elevated position relative to the ground 2 a circumferentially corrugated cylindrical container 3 of suitable material, preferably metal. The container 3 encircles the post 1 and has formed therein a plurality of openings or perforations 4. It may be well to here state that the container 3 is for the reception of a suitable vermin exterminating medium, such as petroleum grease, and the perforations 4 are for the discharge of said medium onto the animal. The container 3 is open at both ends and it will also be noted that certain of the perforations 4 are in the valleys defined by the circumferential corrugations of said container.

The container 3 is mounted for universal swinging movement on the post 1 through the medium of a pin or rod 5 which is mounted diametrically in the upper or top portion of said container. The supporting rod 5 passes through an opening 6 which is provided therefor in the upper end portion of the supporting post 1. Attention is here invited to the fact that the opening 6 is of materially greater diameter than the rod 5 for permitting said rod to swing in a vertical plane.

The container 3 is closed, at its bottom, through the medium of a flexible fabric cone 7, said cone 7 being preferably of canvas. The lower portion of the flexible cone 7 is turned or folded upwardly around the lower end portion of the container 3 and secured thereto by a clamp 8 in the form of a split ring, the turned up portion of said cone 7 being designated by the reference numeral 9. The top of the cone 7 is secured firmly to the post 1 by a clamp 10 which is also preferably in the form of a split ring.

Briefly, the operation of the device is as follows:

The exterminating medium, such as petroleum grease, is placed in the container 3 through the open top thereof and gravitates to the lower portion of said container around the flexible cone 7. The container 3 is normally substantially concentric with the post 1. However, when a hog rubs against the lower portion of the container 3 said container is swung on the post 1 in a manner to eject the exterminating medium through the openings or perforations 4 onto the animal's hide. The container 3 may be expeditiously removed from the post 1 when desired by simply removing the rod 5 and the clamp 8. It will be noted that the rod 5 is in the form of an elongated, headed bolt having a nut threaded on one end thereof. Should dirt or other foreign matter be worked into the device, it settles to the bottom and can be easily removed by simply opening the clamp 8 in a manner to permit the turned up portion 9 of the cone 7 to be lowered, after which said dust or other foreign matter may be conveniently scraped out of the bottom of the container 3. It will thus be seen that it is not necessary to remove the device from the supporting post to accomplish the cleaning operation.

It is believed that the many advantages of a hog greaser constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

A hog greaser comprising a post, a substantially cylindrically, circumferentially corrugated container mounted for substantially universal swinging movement on said post, said container being adapted for the reception of a vermin exterminating medium and having perforations therein for the discharge of said medium, certain of the perforations being between the corrugations, a flexible cone secured at one end, around the post at an intermediate point in the container, the other end portion of the flexible cone being turned up around the lower portion of the container, and a clamp engaged between certain of the corrugations for securing the turned up end portion of the cone around the container.

FRANCES A. PARKHOUSE.